United States Patent [19]

Iwata et al.

[11] Patent Number: 4,964,045
[45] Date of Patent: Oct. 16, 1990

[54] TRACTION CONTROL SYSTEM FOR AUTOMOTIVE VEHICLE

[75] Inventors: Toru Iwata; Shinji Katayose; Minoru Tamura, all of Kanagawa, Japan

[73] Assignee: Nissan Motor Co., Ltd., Japan

[21] Appl. No.: 333,957

[22] Filed: Apr. 6, 1989

[30] Foreign Application Priority Data

Apr. 7, 1988 [JP] Japan ................... 63-84140

[51] Int. Cl.⁵ .............................................. B60T 8/58
[52] U.S. Cl. ................... 364/426.02; 180/197; 303/103; 303/100
[58] Field of Search .......... 364/431.07, 426.02, 364/426.03, 581, 575; 180/197; 303/100, 102, 103, 106

[56] References Cited

U.S. PATENT DOCUMENTS 4,674,050  6/1987  Kubo ..................... 364/426.02
4,739,856  4/1988  Inagaki ..................... 180/197
4,755,945  7/1988  Kade et al. ............ 364/426.02
4,805,103  2/1989  Matsuda ................ 364/426.02
4,858,136  8/1989  Tanaka et al. ......... 364/431.07

Primary Examiner—Gary Chin
Attorney, Agent, or Firm—Leydig, Voit & Mayer

[57] ABSTRACT

A traction control system is associated with a vehicular brake system which can control braking force for respective individual driving wheel independently of each other on the basis of an average wheel slippage data. The average wheel slippage data is derived introducing weighing technology giving higher weight for wheel slippage on a driving wheel, on which occurring smaller wheel slippage in comparison with the other. The traction control performs control of application of braking force for respective driving wheel independently of each other so that wheel traction recovering efficiency at respective driving wheel can be optimized.

20 Claims, 13 Drawing Sheets

TRACTION CONTROL SYSTEM FOR AUTOMOTIVE VEHICLE

BACKGROUND OF THE INVENTION

1. Field of the Invention

The present invention relates generally to an automotive traction control system for suppressing wheel spinning or wheel slippage at driving wheels.

2. Description of the Background Art

Japanese Patent First (unexamined) Publication (Tokkai) Showa 61-85248 discloses one of typical construction of the prior proposed traction control system for the automotive vehicle. In the disclosed system, an engine output torque is lowered in response to occurrence of wheel slippage and a braking force is applied to the driving wheels for recovery of traction. In the shown system, slip control is initiated in response to average wheel slippage of left and right driving wheels. Such a way of control cannot be always satisfactorily precise because of a possibility of difference of road friction levels at left and right wheels.

Namely, in case wheel traction is to be recovered by applying a braking force for the driving wheels, the braking force tends to become insufficient for the driving wheel on a low friction road and unsatisfactory in suppression of wheel slippage. On the other hand, the braking force applied for the driving wheel on high friction roads tends to become excessive, and it unnecessarily lowers the wheel speed. Where wheel traction is recovered by lowering engine torque, excessive lowering of the engine output due to wheel slippage on the low friction road can cause degradation of engine acceleration characteristics and thus cause degradation of drivability of the vehicle.

Another prior proposed traction control system has been disclosed in the co-pending U.S. patent application Ser. No. 918,125, filed on Oct. 14, 1986 and assigned to the common assignee to the present invention. The same invention has also been disclosed in the German Patent First Publication 36 34 627. In the disclosure, a method and a system derive a value representative of an actual vehicle speed in strict correspondence to actual vehicle speed. The value can be utilized to detect wheel slippage and allows precise traction control, anti-skid brake control and so forth. The method for deriving wheel slippage, according to the present invention, includes a step of deriving a projected vehicle speed, the rate of change of which varies with road surface friction. Wheel slippage is derived from on the projected vehicle speed and instantaneous wheel speed. In practice, the method includes a step for detecting the force exerted on a vehicular wheel, which force includes a resistance variable depending upon the road surface friction $\mu$. Based on the detected force, the projected vehicle speed variation pattern is derived so as to derive an instantaneous projected vehicle speed.

A further prior proposed traction control system has been disclosed in the co-pending U.S. patent application Ser. No. 918,137, filed on Oct. 14, 1986, and assigned to the common assignee to the present invention. This co-pending U.S. patent application discloses a traction control system which has a plurality of wheel speed sensor means for producing wheel speed indicative signals respectively representative of wheel speeds of associated vehicular wheels. Wheel slippage is detected by comparing wheel speed measured by the wheel speed sensor means and an approximated vehicle speed indicative value. The approximated vehicle speed indicative value is derived based on one of the wheel speeds selected depending upon a vehicle speed.

These traction control systems owned by the owner of the present invention are successful in some aspects; however, there space for improvement in order to obtain better traction control performance.

SUMMARY OF THE INVENTION

Therefore, it is an object of the present invention to provide a traction control system which can optimize wheel traction recovery at respective individual driving wheels.

Another object of the invention is to provide an improved technology for deriving wheel slippage data with high precision level in view of the vehicle driving condition.

In order to accomplish aforementioned and other objects, a traction control system, according to the present invention, is associated with a vehicular brake system which can control braking force for respective individual driving wheels independently of each other on the basis of an average wheel slippage data. The average wheel slippage data is derived by introducing weighing technology giving higher weight for wheel slippage on a driving wheel, on which smaller wheel slippage occurs in comparison with the other. The traction control performs control of application of braking force for respective driving wheel independently of each other so that wheel traction recovering efficiency at respective driving wheel can be optimized.

According to one aspect of the invention, a traction control system for an automotive vehicle, comprises:

first engine controlling means associated with an automotive internal combustion engine, for adjusting an engine output;

second brake controlling means associated with a first driving wheel which is connected to the automotive internal combustion engine to be driven by the engine output and associated with a first brake circuit connected to a first wheel cylinder of the first driving wheel, for controlling braking force to be generated in the first wheel cylinder;

third brake controlling means associated with a second driving wheel which is connected to the automotive internal combustion engine to be driven by the engine output and associated with a second brake circuit connected to a second wheel cylinder of the second driving wheel, for controlling braking force to be generated in the second wheel cylinder;

first sensor means for monitoring wheel speed of the first driving wheel to produce a first driving wheel speed indicative signal;

second sensor means for monitoring wheel speed of the second driving wheel to produce a second driving wheel speed indicative signal;

third sensor means for monitoring vehicular body speed representative parameter for producing vehicular body speed representative data;

first arithmetic means for deriving a wheel slippage at the first driving wheel on the basis of the first driving wheel speed indicative signal and the vehicular body speed representative data for generating a first wheel slippage data;

second arithmetic means for deriving a wheel slippage at the second driving wheel on the basis of the second driving wheel spaced indicative signal and the vehicular body speed representative data for generating a second wheel slippage data;

third arithmetic means for deriving a weighted mean of the first and second wheel slippage data with a weighing coefficient which provides greater weight for one of the first and second wheel slippage data representing smaller wheel slippage than the other;

first control means, associated with the first engine controlling means, for controlling the engine output on the basis of the weighted mean; and second control means, associated with the second brake controlling means, for controlling operation the latter for adjusting braking force to be generated in the first wheel cylinder on the basis of the first wheel slippage data; and third control means, associated with the third brake controlling means and operative independently of the second control means, for controlling operation of the third brake controlling means, for adjusting braking force to be generated in the second wheel cylinder on the basis of the second wheel slippage data.

Preferably, the first control means is associated with a fourth sensor monitoring position of an accelerator for adjusting the engine output according to an engine output variation characteristics variable between a predetermined initial minimum output and a predetermined initial maximum output linearly corresponding to position of the accelerator which is variable between a predetermined minimum operational position and a predetermined maximum operational position, and the first control means is responsive to the weighted mean greater than a predetermined first threshold for modifying the engine output variation characteristics by setting the maximum output at a predetermined first value smaller than the initial maximum output. The first control means is further responsive to the weighted mean greater than a predetermined second threshold for setting the engine output at a predetermined second value which is smaller than the first value.

The traction control system may further comprise a fourth arithmetic means for deriving variation of the weighted mean for discriminating increasing and decreasing of the wheel slippage, and the first control means is associated with a fourth sensor monitoring position of an accelerator for adjusting the engine output according to an engine output variation characteristic. The output variation characteristic is variable between a predetermined initial minimum output and a predetermined initial maximum output which linearly corresponds to the position of the accelerator. The position of the accelerator is variable between a predetermined minimum operational position and a predetermined maximum operational position, and the first control means is active while the weighted mean is greater than a predetermined first threshold and performs traction control operation for modifying the engine output variation characteristics by setting the maximum output at a predetermined first value smaller than the initial maximum output when the weighted means is increasing. The first control means is further responsive to the weighted mean greater than a predetermined second threshold for setting the engine output at a predetermined second value which is smaller than the first value. The first means may be responsive to weighted mean decreasing across a third threshold for gradually returning the engine output variation characteristics toward an initial characteristics in which the engine output varies between a predetermined initial minimum output and a predetermined initial maximum output linearly corresponding to position of the accelerator which is variable between a predetermined minimum operational position and a predetermined maximum operational position.

The first means may vary the engine output characteristics in stepwise fashion with a predetermined interval. The predetermined third threshold is set at a value greater than the first threshold and smaller than the second threshold.

In the preferred construction, each of the second and third brake controlling means comprises:

a first valve means disposed within the associated one of the first and second brake circuit for operation in a normal mode, to establish communication with the wheel cylinder to a master cylinder for controlling braking force depending upon magnitude of depression of a brake pedal, and operable in a traction control mode, for disconnecting the wheel cylinder from the master cylinder and forming a closed circuit including the wheel cylinder to compress the working fluid therein for increasing braking force in the wheel cylinder; and a second valve means associated with the first valve and controlled by one of the second and third control means, for switching operational mode of the normal mode and the traction control mode.

The first valve means may operate to increase the braking pressure in the wheel cylinder and to hold the braking force constant, in the traction control mode.

According to another aspect of the invention, a traction control system for an automotive vehicle, comprises:

first engine controlling means associated with a automotive internal combustion engine, for adjusting an engine output;

second brake controlling means associated with a first driving wheel which is connected to the automotive internal combustion engine to be driven by the engine output and associated with a first brake circuit connected to a first wheel cylinder of the first driving wheel, for controlling braking force to be generated in the first wheel cylinder;

third brake controlling means associated with a second driving wheel which is connected to the automotive internal combustion engine to be driven by the engine output and associated with a second brake circuit connected to a second wheel cylinder of the second driving wheel, for controlling braking force to be generated in the second wheel cylinder;

first sensor means for monitoring wheel speed of the first driving wheel to produce a first driving wheel speed indicative signal;

second sensor means for monitoring wheel speed of the second driving wheel to produce a second driving wheel speed indicative signal;

third sensor means for monitoring vehicular body speed representative parameter for producing vehicular body speed representative data;

first arithmetic means for deriving wheel slippage at the first driving wheel on the basis of the first driving wheel speed indicative signal and the vehicular body speed representative data;

second arithmetic means for deriving wheel slippage at the second driving wheel on the basis of the second driving wheel speed indicative signal and the vehicular body speed representative data;

third arithmetic means for deriving a weighted mean of the first and second wheel slippage data with a weighing coefficient which provides greater weight for one of the first and second wheel slippage data representing smaller wheel slippage than the other;

first control means, associated with the first engine controlling means, for controlling the engine output on the basis of the weighted mean and variation of the weighted mean; and second control means, associated with the second brake controlling means, for controlling operation of the latter for adjusting braking force to be generated in the first wheel cylinder on the basis of the first wheel slippage data and variation of the first wheel slippage; and third control means, associated with the third brake controlling means and operative independently of the second control means, for controlling operation of the third brake controlling means, for adjusting braking force to be generated in the second wheel cylinder on the basis of the second wheel slippage data and variation of the second wheel slippage data.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
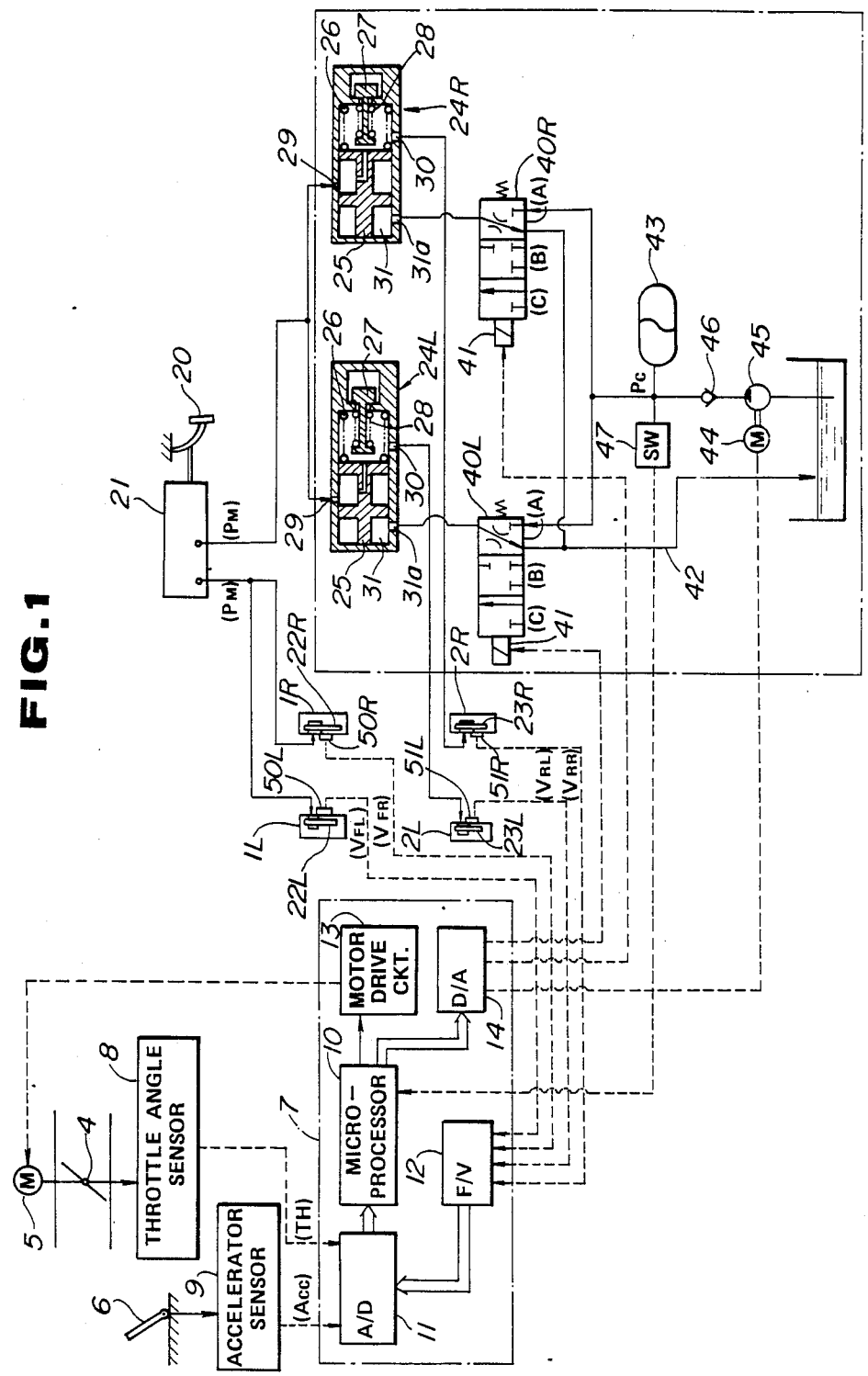
FIG. 1 is a block diagram of the preferred embodiment of a traction control system according to the present invention.
Figure 2:
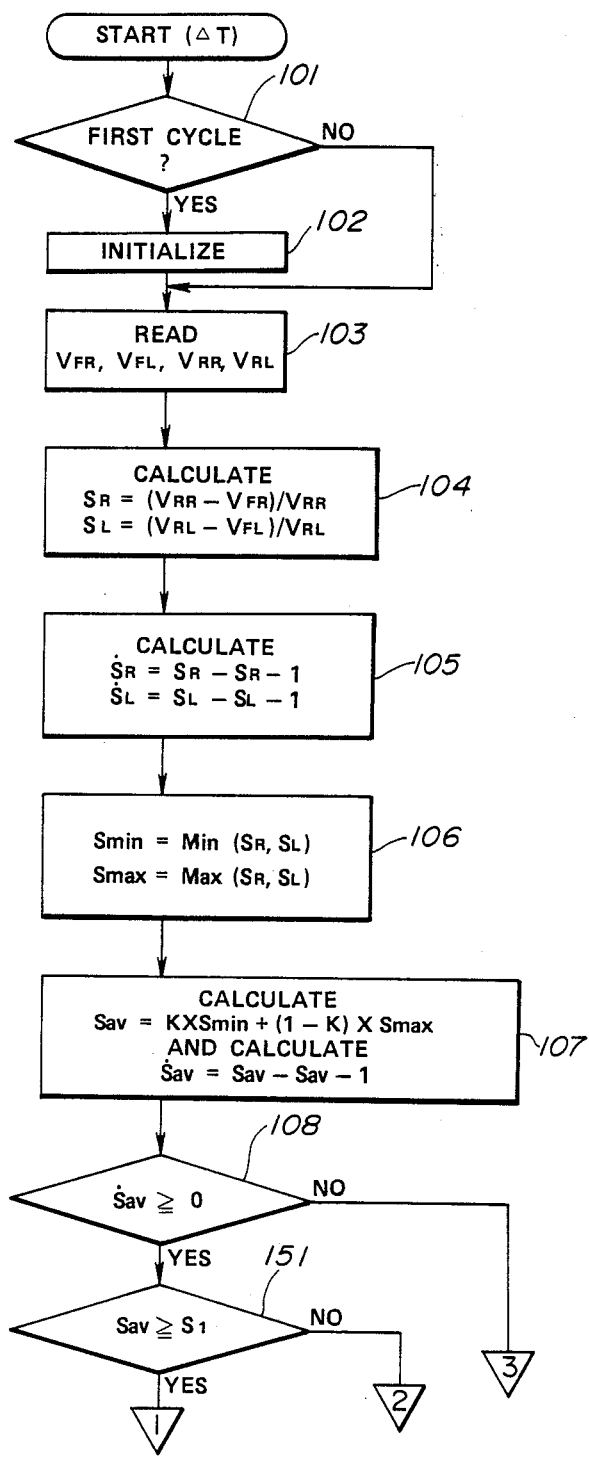
FIGS. 2 through 7 show a sequence of flowchart of a traction control program to be executed in the preferred embodiment of the traction control system of FIG. 1.
Figure 3:
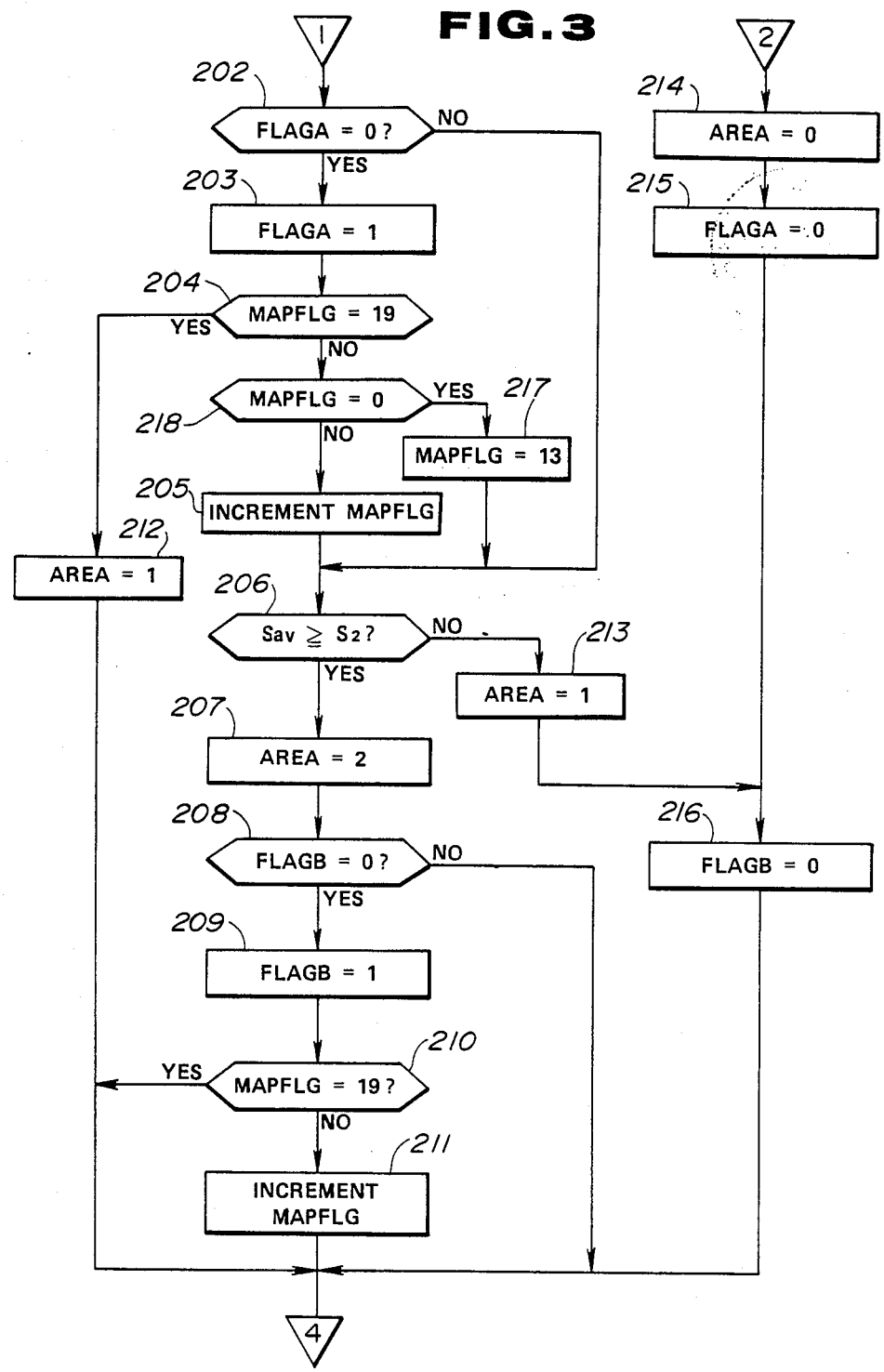

Referring now to the drawings particularly to FIG. 1, the preferred embodiment of a traction control system, according to the present invention, is illustrated in terms of application for a vehicle having left and right driven wheels 1L and 1R and left and right driving wheels 2L and 2R. As can be appreciated, the driven wheels 1L and 1R are not connected to an automotive internal combustion engine and thus rotates freely according to traveling speed of the vehicle. On the other hand, the driving wheels 2L and 2R are connected to the automotive engine through known power train to be driven by the driving torque distributed through the power train. In the shown embodiment, the vehicle illustrated has rear-wheel drive power train layout. Therefore, the driven wheels 1L and 1R are front wheels and the driving wheels 2L and 2R are rear wheels. The engine includes an induction system, in which a throttle valve 4 is disposed for adjusting intake air flow rate depending upon a demand for engine output.

In the shown embodiment, the throttle valve 4 is associated with a stepping motor 5 which serves as a servo motor for controlling the angular position of the throttle valve. The stepping motor 5 is connected to a control unit 7 so as to be controlled the driving direction, i.e. forward and reverse direction, and step number for driving in the selected direction. The control unit 7 normally derives a throttle servo control signal defining the number of steps and direction to drive the stepping motor 5 on the basis of the magnitude of depression of an accelerator pedal 6, which depression magnitude of the accelerator pedal is detected by means of an accelerator sensor 9. The accelerator sensor 9 produces an accelerator position indicative signal ACC indicative of the monitored magnitude of depression of the accelerator pedal 6. A throttle angle sensor 8 is associated with the throttle valve 4 for monitoring the angular position of the throttle valve 4 to produce a throttle angle position signal TH indicative thereof.

The control unit 7 includes a microprocessor 10. An analog-to-digital (A/D) converter 11 is provided to receive analog form accelerator position indicative signal ACC and the throttle angle position signal TH to convert into digital signals applicable for the microprocessor. A frequency-to-voltage (F/V) converter 12 is also provided for receiving wheel speed indicative alternating current form frequency signals $V_{FL}$, $V_{FR}$, $V_{RL}$ and $V_{RR}$ produced by wheel speed sensors 50L, 50R, 51L and 51R. Each of these wheel speed sensors 50L, 50R, 51L and 51R monitors rotation speed of the associated one of wheel speed to produce the alternating currents, which has frequency representative of rotation speed of the associated wheel.

Each of front-left, front-right, rear-left and rear-right wheels 1L, 1R, 2L and 2R is associated with wheel cylinders 22L, 22R, 23L and 23R connected to a master cylinder 21 which is mechanically connected to a brake pedal 20, via a hydraulic brake circuits. Traction control valves 24L and 24R are disposed in the brake circuits connecting the master cylinder 21 to the wheel cylinders 23L and 23R. Each of the traction control valves 24L and 24R has a valve spool 25. The valve spool 25 is associated with a bias spring 26 which normally biases the valve spool toward left in the drawing. A plunger 27 is also biased toward left in the drawing by means of a bias spring 28. Therefore, the valve spool 25 and the plunger 27 are normally placed at the position illustrated in FIG. 1.

At this valve position, the braking fluid pressure $P_M$ is built up in the master cylinder 21 and communicated through the valve housing via an inlet port 29 and a communication path defined through valve spool an outlet port 30. On the other hand, when the valve spool 25 is shifted toward right in the drawing, the downstream end of the communication path formed through the valve spool 25 is closed by the associated end of the plunger 27 to block fluid communication between the inlet port 29 and the outlet port 30. By blocking fluid communication in the valve housing, the outlet port 30 is disconnected from the brake circuit. At this position, further shifting of the valve spool 25 causes compression of the chamber to increase the fluid pressure in the wheel cylinders 23L and 23R. The braking force in the wheel cylinder thus increased is held constant at a level where the valve spool 25 is no longer shifted.

The position of the valve spool 25 is controlled by fluid pressure in a chamber 31 which is connected to an electromagnetic valve 40L and 40R. The electromagnetic valves 40L and 40R respectively comprise three position valves. Each of the electromagnetic valves 40L and 40R has one port connected to the port 31a of associated one of the traction control valves 24L and 24R. Also, the electromagnetic valves 40L and 40R have inlet ports connected to a fluid pump 45 via an one-way check valve 46 and a supply line, and to a pressure accumulator 43, and drain ports connected to a fluid reservoir through a drain line 24. As seen, the fluid pump 45 is associated with an electric motor 44 to be driven by the driving torque of the latter. A pressure switch 47 is provided in the supply line to monitor the fluid pressure Pc accumulated in the pressure accumulator 43 to stop driving of the electric motor 44 when the fluid pressure Pc accumulated in the pressure accumulator is maintained higher than or equal to a predetermined value.

In order to control operation of the electric motor 44, the pressure switch 47 is connected to the microprocessor 10 of the conical unit 7. The microprocessor 10 derives a motor control signal on the basis of the input from the pressure switch 47 and output to the electric motor 44 via a digital-to-analog (D/A) converter 14.

The electromagnetic valves 40L and 40R are provided electromagnetically operable solenoids 41. The solenoids 41 are connected to the microprocessor 10 via the D/A Converter 14. The microprocessor 10 normally places the electromagnetic valves 40L and 40R at the position as illustrated in FIG. 1, in which the port 31a is directly connected to the drain port. Therefore, at the valve position of the electromagnetic valves 40L and 40R as illustrated, the pressure in the chamber 30 is maintained substantially zero. This valve position will be hereafter referred to as "normal valve position (A)". According to the operational magnitude of the solenoids 41, the electromagnetic valves 40L and 40R vary the valve position to disconnect all ports to each other. At this position, the pressure in the chamber 30 is maintained constant at a level immediately before shifting of the valve into this position. The valve position to maintain the pressure in the chamber 30 will be hereafter referred to as "pressure holding valve position (B)". The electromagnetic valves 40L and 40R are further operable to a valve position where the pressure in the chamber 30 is increased. This valve position will be hereafter referred to as "pressure increasing valve position (C)".

The microprocessor 10 performs control operation by executing routines of FIGS. 2 to 8. As set forth above, the microprocessor 10 performs a throttle valve position control operation for controlling the angular position of the throttle valve 4. The microprocessor 10 also performs brake control for controlling braking force to be applied to the driving wheels 2L and 2R. Furthermore, the microprocessor 10 controls operation of the electric motor 44 to control the operation of the fluid pump 45.

FIGS. 2 to 7 show a sequence of routine as a main routine of traction control. The shown routine is programmed as an interrupt routine for periodic execution with a predetermined interval, e.g. every 20 msec, under the control of an operating system which is not shown.

After starting execution of the routine of FIGS. 2 to 7, at a step 101, check is performed whether the current execution cycle is the first cycle after starting turning ON of main power. When the current execution cycle is the first cycle and thus the answer at the step 101 is positive, initialization of the system is performed at a step 102. On the other hand, when the current execution cycle is not the first step and thus the answer at the step 101 is negative, the initialization step 102 is jumped.

At a step 103, the wheel speed indicative data $V_{FL}$, $V_{FR}$, $V_{RL}$ and $V_{RR}$ read. The data is derived from the wheel speed indicative signals of the wheel speed sensors 50L, 50R, 51L and 51R by F/V conversion by the A/D converter 11. Based on the read wheel speed indicative data $V_{FL}$, $V_{FR}$, $V_{RL}$ and $V_{RR}$, wheel slippages $S_L$ and $S_R$ of the driving wheels 2L and 2R are calculated at a step 104. In derivation of the wheel slippages $S_L$ and $S_R$, the driven wheel speed indicative data $V_{FL}$ and $V_{FR}$ are taken as vehicle speed representative data. Namely, since the driven wheels 1L and 1R do not receive the driving torque from the engine and simply rotate according to the vehicle traveling, no wheel slippage will occur on these driven wheels 1L and 1R. Therefore, wheel slippage $S_L$ and $S_R$ at the driving wheels 2L and 2R can be calculated from the following equations:

$$S_L = (V_{RL} - V_{FL})/V_{RL}$$

$$S_R = (V_{RR} - V_{FR})/V_{RR}$$

At a step 105, wheel slippage variation magnitudes $\dot{S}_L$ and $\dot{S}_R$ are derived on the basis of the wheel slippages $S_L$ and $S_R$ derived at the step 104 and the wheel slippages $S_{L-1}$ and $S_{R-1}$ derived in the immediately preceding execution cycle. At the step 105, the wheel slippage variation magnitudes $\dot{S}_L$ and $\dot{S}_R$ are calculated from the following equations $$\dot{S}_L = S_L - S_{L-1}$$

$$\dot{S}_R = S_R - S_{R-1}$$

At a step 106, the wheel slippages $S_L$ and $S_R$ at the left and right driving wheels 2L and 2R are compared to each other. In the step 106, the greater one of wheel slippages is set as select-HIGH slippage $S_{max}$ and the smaller one is set as select-LOW slippage $S_{min}$. At a step 107, a weighted mean $S_{av}$ of the select-HIGH slippage $S_{max}$ and the select-LOW slippage $S_{min}$ is derived utilizing a weighing coefficient K which is variable in a range between 0.6 to 0.9 for example. Practical calculation of the weighted mean $S_{av}$ is derived from the following equation:

$$S_{av} = K \times S_{min} + (1-K) \times S_{max}$$

Then, at the step 107, variation magnitude $S_{av}$ of the weighted mean $S_{av}$ is also calculated on the basis of the derived weighted mean $S_{av}$ in the current execution cycle and $S_{av-1}$ according to the following equation:

$$S_{av} = S_{av} - S_{av-1}$$

Figure 9:
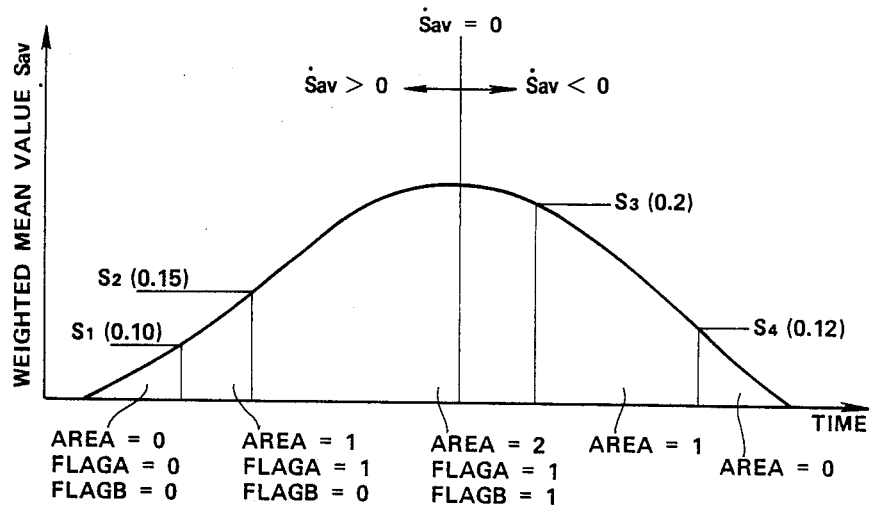
FIG. 9 is a chart showing variation characteristics of weighted mean of wheel slippage, according to which a weighted mean of wheel slippage is derived.

After deriving the variation magnitude $S_{av}$ of the weighted mean $S_{av}$, check is performed whether the weighted mean variation magnitude $S_{av}$ is a greater than or equal to zero, at a step 10B. By checking the weighted mean variation magnitude $S_{av}$ at the step 108, discrimination can be made whether wheel slippage is increasing or decreasing. Namely, as shown in FIG. 9, when the weighted mean $S_{av}$ varies as shown, the weighted means variation magnitude $S_{av}$ becomes zero at the peak value of the weighted mean $S_{av}$. In the left side of FIG. 6, namely while the weighted mean $S_{av}$ is increasing, the weighted mean variation magnitude $S_{av}$ is maintained at positive value. On the other hand, in the right side of FIG. 6, namely while the weighted mean $S_{av}$ is decreasing, the weighted mean variation magnitude $S_{av}$ becomes negative value.

If the weighted mean variation magnitude $S_{av}$ is smaller than zero and thus the answer at the step 108 is negative, then process jumps to a step 301 (FIG. 4) discussed later. If the weighted mean variation magnitude $S_{av}$ is positive value and thus the answer at the step 108 is positive, the weighted mean $S_{av}$ is compared with a first wheel slippage criterion $S_1$ at a step 151. In the practical embodiment, the first wheel slippage criterion $S_1$ is set at a value of 0.10. If the weighted mean $S_{av}$ is smaller than the first wheel slippage criterion $S_1$ as checked at the step 151, process jumps to a step 214, in which a slippage area indicative data AREA is set to zero (0). Then, at a step 215, a first wheel slippage indicative flag FLAGA is set to zero (0). Also, at a step 216, a second wheel slippage indicative flag FLAGB is set to zero (0).

On the other hand, if the weighted mean $S_{av}$ is greater than or equal to the first wheel slippage criterion $S_1$, the first wheel slippage indicative flag FLAGA is checked at a step 202. Since the weighted mean $S_{av}$ as checked at the step 151 is greater than or equal to the wheel slippage threshold $S_1$, the negative answer at the step 202 represents that the current execution cycle is the first cycle after the weighted means $S_{av}$ is increased to be greater than or equal to the first wheel slippage criterion $S_1$. Therefore, when the answer at the step 202 is negative, the first wheel slippage indicative flag FLAGA is set to one (1) at a step 203. After setting the first wheel slippage indicative flag FLAGA at the step 203, setting of a throttle valve open angle characteristics is performed through steps 204, 218, 217 and 205. Setting of the throttle valve open angle characteristics is done according to the chart shown in FIG. 10.

Figure 10:
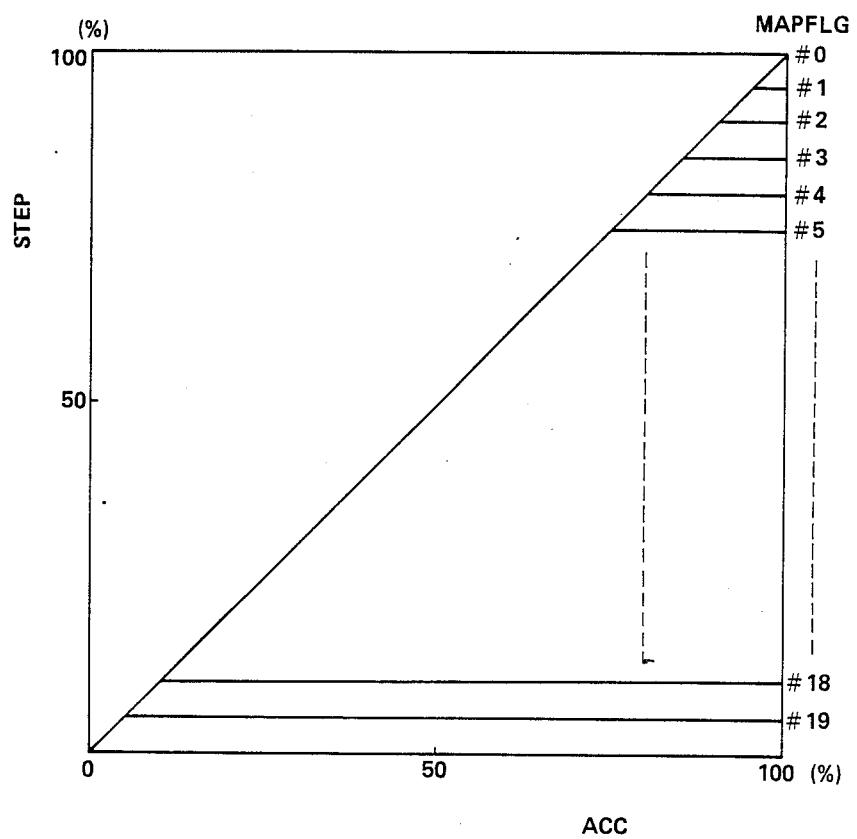
FIG. 10 is a chart showing relationship between depression magnitude ACC of an accelerator pedal and a target throttle valve open angle STEP.

As shown in FIG. 10, the throttle valve open angle characteristics are set for determining the step number STEP of the stepping motor in relation to the accelerator pedal position ACC. In the shown chart, step number STEP varies in a range of 0% (corresponding to the throttle valve fully closed position) to 100% (corresponding to the throttle valve fully open position). On the other hand, the accelerator pedal position ACC varies in a range of 0% (corresponding to the accelerator pedal fully released position) to 100% (corresponding to the accelerator pedal fully depressed position). The throttle valve open angle characteristics define the maximum throttle valve open angle and is represented by a value of throttle valve open angle characteristics indicative flag MAPFLG. In the illustrated embodiment, the throttle valve open angle characteristics is divided into twenty steps (No. 0 to No. 19). When the throttle valve open angle characteristics MAPFLG is set at a value 0, the 100% of stepping number STEP can be obtained in response to 100% of acceleration pedal position ACC. On the other hand, when the throttle valve open angle characteristics MAPFLG is set at 19, less than 10% of stepping number STEP is obtained even at the 100% of accelerator pedal position ACC.

At a step 204, the value MAPFLG of the throttle valve open angle characteristics is checked whether it is equal to 19. If the answer at the step 204 is positive, the wheel slippage area indicative data AREA is set at one (1) at a step 212.

On the other hand, if the answer at the step 204 is negative, the throttle valve open angle characteristics indicative value MAPFLG is checked against 0 at a step 218. If the throttle open angle characteristics indicative value MAPFLG is 0 as checked at the step 218, then the throttle valve open angle characteristics indicative value MAPFLG is set at 13, which is a predetermined standard traction controlling throttle open angle characteristic, at a step 217. If the throttle open angle characteristics indicative value MAPFLG is other than 0 as checked at the step 218, the value MAPFLG is incremented by 1 at a step 205.

Therefore, through the processes in the steps 204, 218, 217 and 205 maximum throttle valve open angle can be reduced to be smaller than or equal to a predetermined throttle valve angular position (%) represented by the throttle open angle characteristic indicative value MAPFLG of 13. As can be seen from FIG. 10, though the shown embodiment employs common throttle valve angular displacement rate over all of the throttle valve open angle characteristics, it may be possible to vary not only the maximum open angle but also throttle valve angular displacement rate in relation to the variation of the accelerator pedal position. Such technology for varying the throttle valve angular displacement rate versus the accelerator pedal position variation rate has been disclosed in U.S. Pat. No. 4,809,182 issued on Feb. 2, 1989, and assigned to common assignee to the present invention. The disclosure of the above-identified U.S. patent will be herein incorporated by reference for the sake of disclosure.

After one of the steps 217 and 205, the process goes to a step 206, in which the weighted mean $S_{av}$ of the left and right driving wheel slippages $S_L$ and $S_R$ is compared with a second wheel slippage criterion $S_2$. As seen from FIG. 9, the second wheel slippage criterion $S_2$ is set at greater value, e.g. 0.15 than the first wheel slippage criterion $S_1$ set forth above. When the weighted mean $S_{av}$ is smaller than the second wheel slippage criterion $S_2$, wheel slippage area indicative data AREA is set at one (1), at a step 213. After setting the wheel slippage area indicative data AREA at the step 213, process goes to the step 216. On the other hand, when the weighted mean $S_{av}$ is greater than or equal to the second wheel slippage criterion $S_2$, the wheel slippage area indicative data AREA is set at two (2) at a step 207. Thereafter, the second wheel slippage indicative flag FLAGB is checked whether it is set, at a step 208. The second wheel slippage indicative FLAGB is set when the weighted mean $S_{av}$ increases across the second wheel slippage criterion $S_2$ and maintained in set state while the weighted mean $S_{av}$ is held greater than or equal to the second wheel slippage criterion $S_2$. Since the weighted mean $S_{av}$ greater than the second wheel slippage criterion $S_2$ is already detected at the step 206, the negative answer at the step 208 implies that the current execution cycle is performed immediately after the timing at which the weighted means $S_{av}$ increases across the second wheel slippage criterion or reaches the second wheel slippage criterion $S_2$. Therefore, the second wheel slippage indicative flag FLAGB is set to one (1) at a step 209. After setting the second wheel slippage flag FLAGB at the step 209, the throttle valve open angle characteristics indicative value MAPFLG is checked whether the value is 19 at a step 210. If the throttle valve open angle characteristics indicative value MAPFLG is smaller than 19, the value is incremented by 1 at a step 211.

Figure 4:
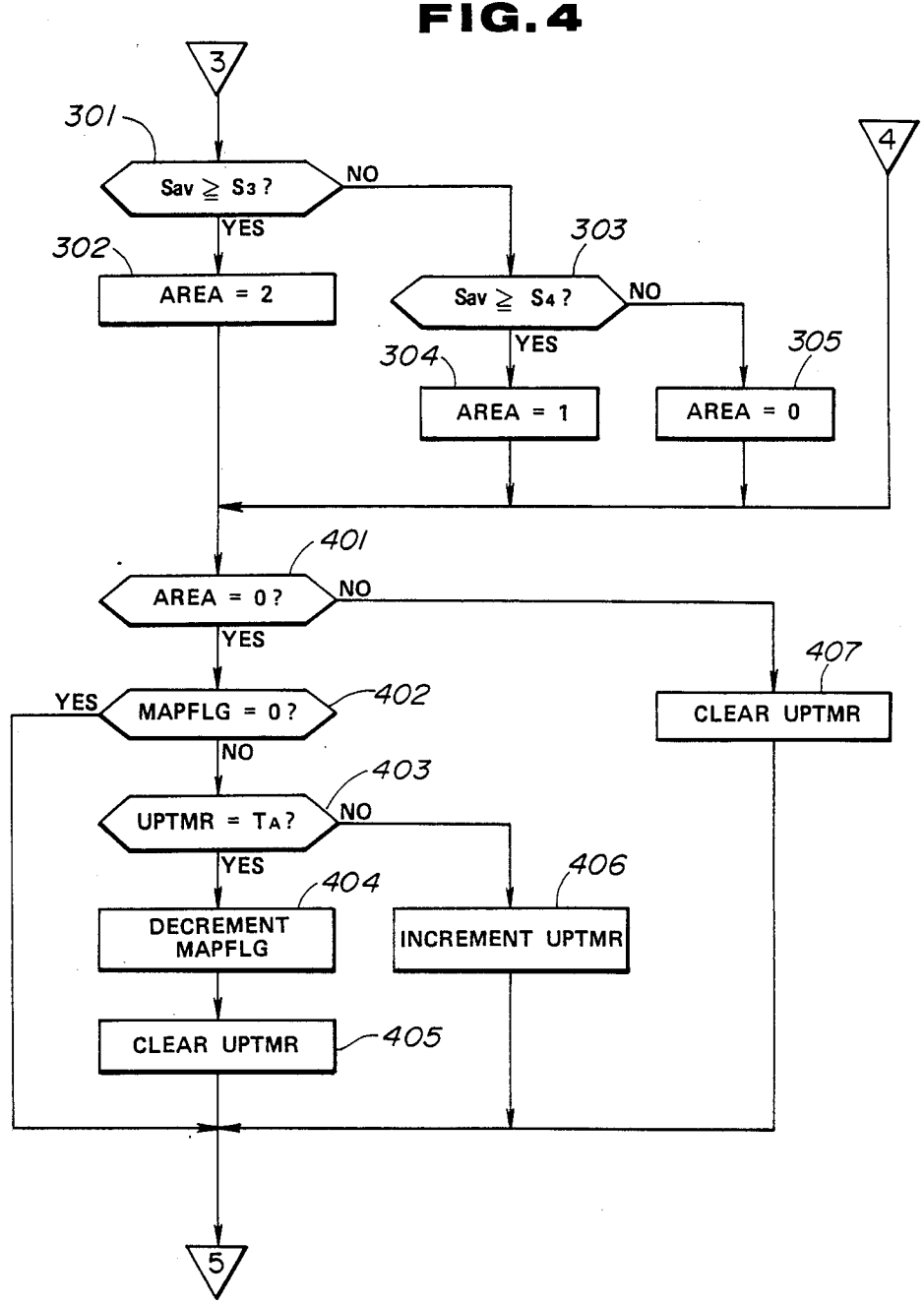
Figure 5:
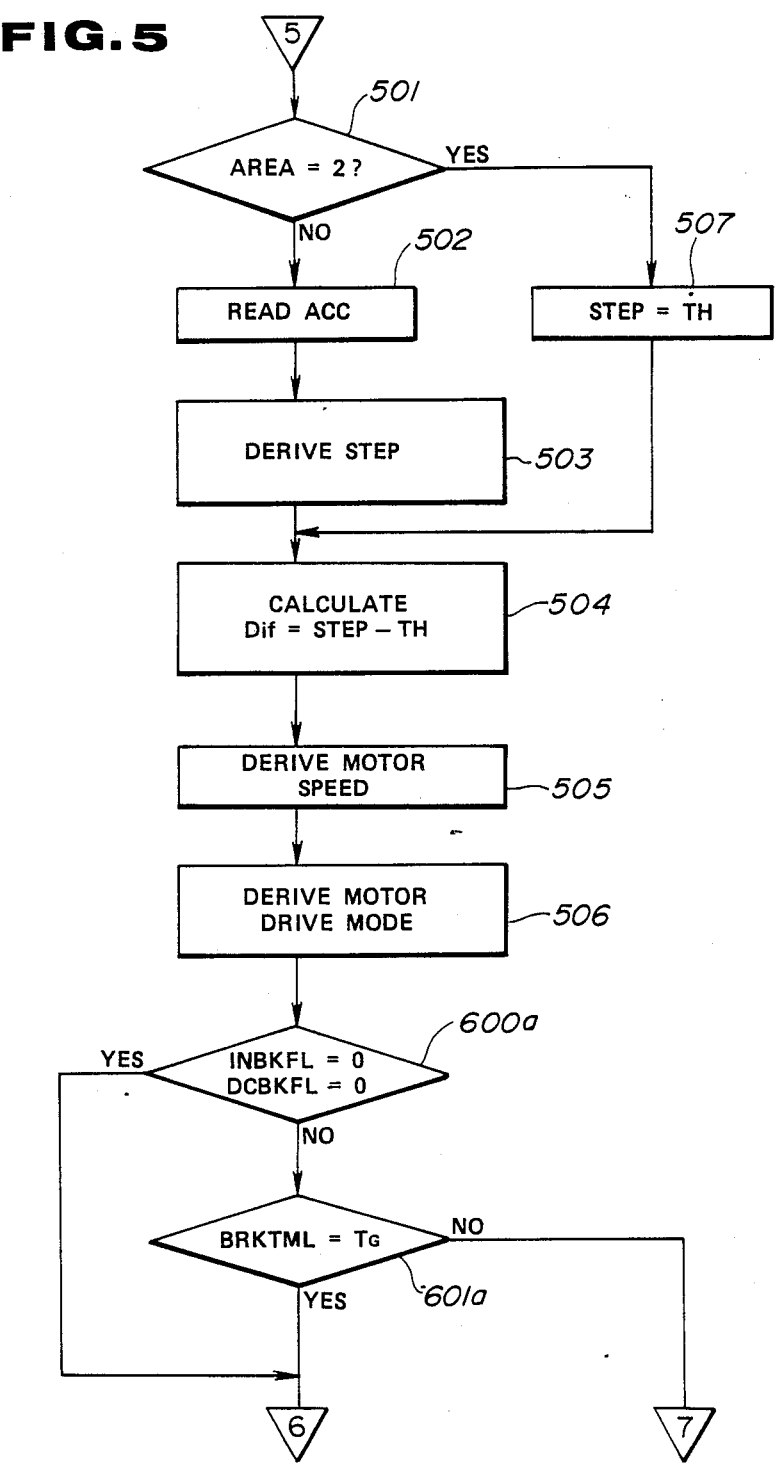
Figure 6:
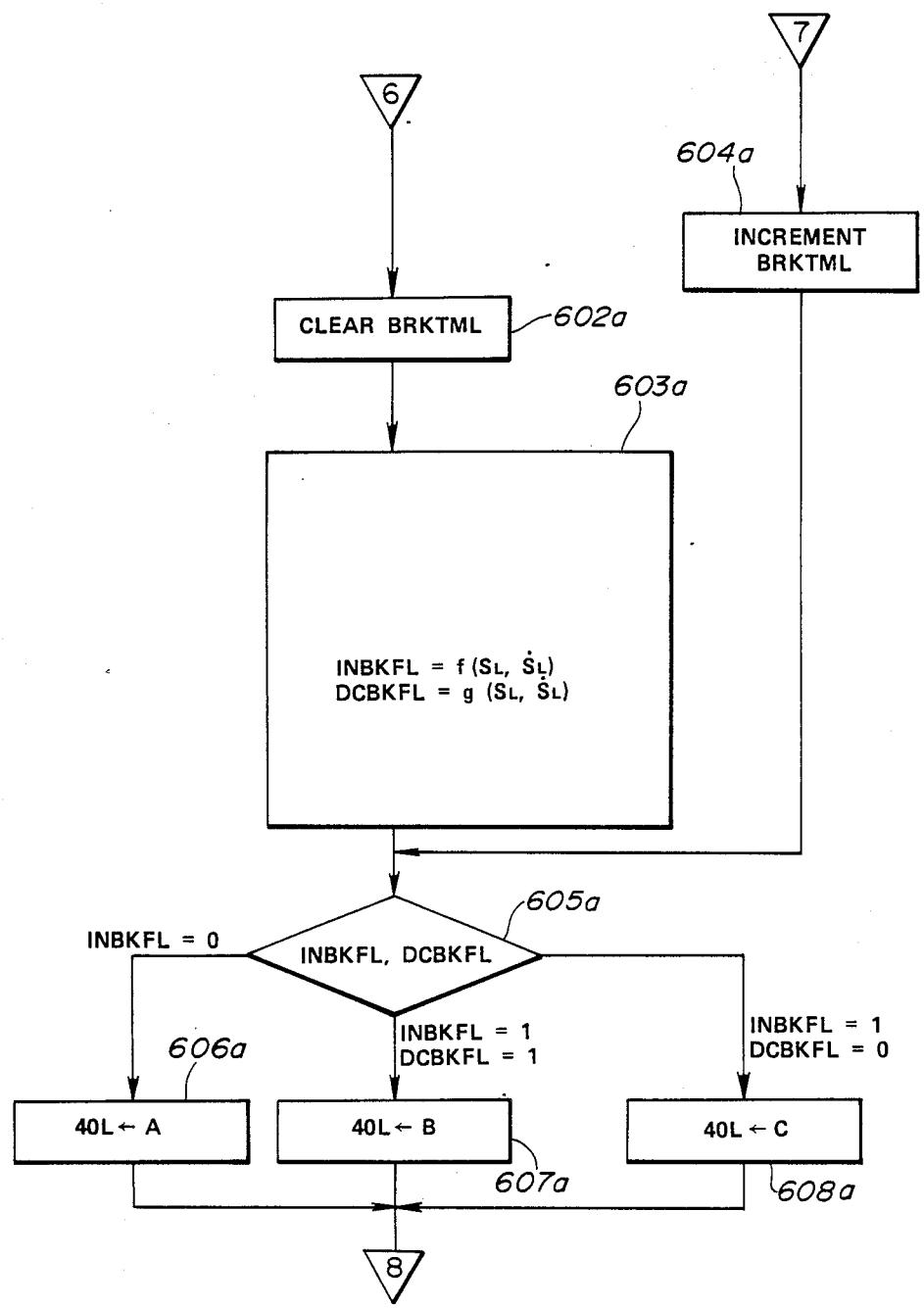
Figure 7:
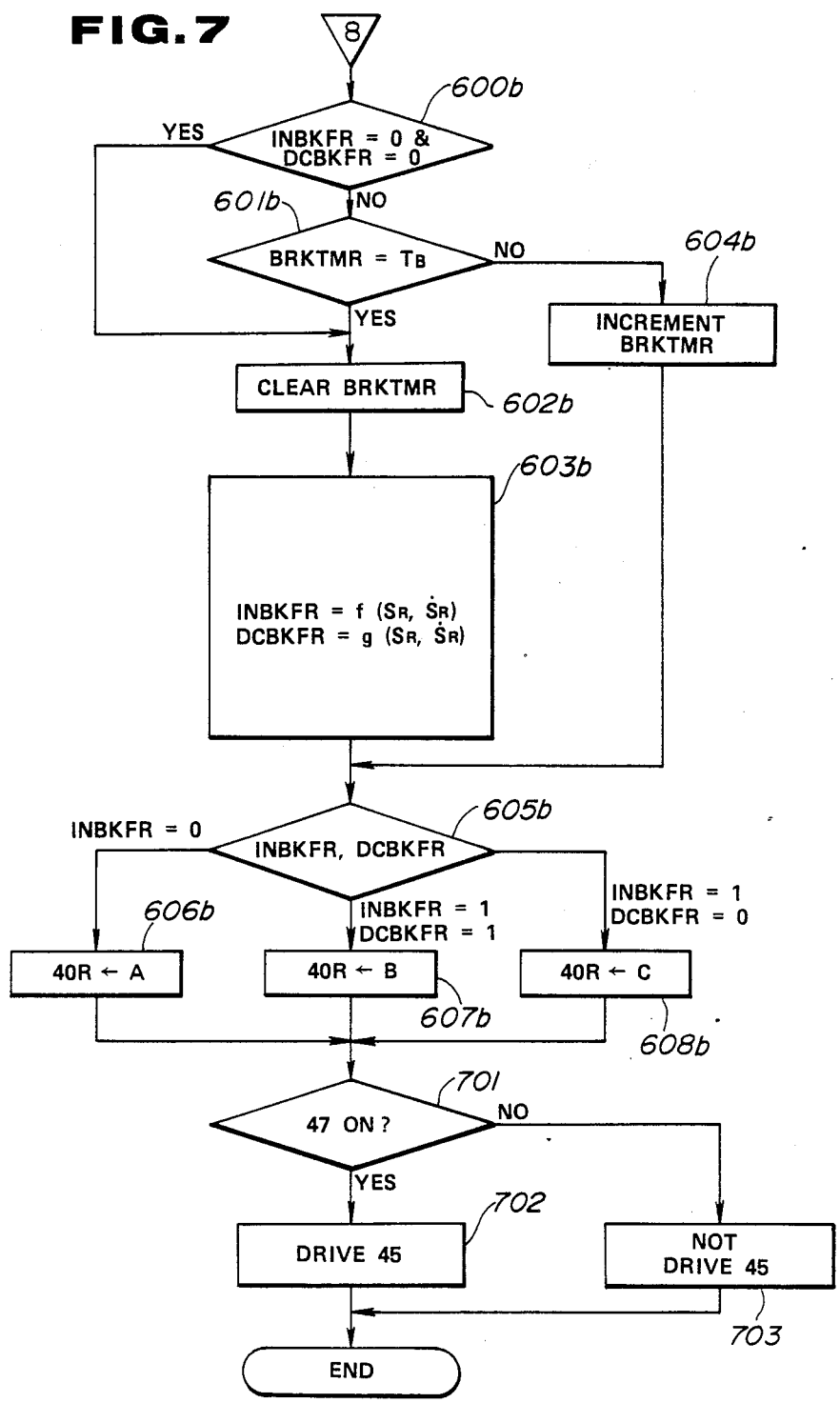

After one of the step 212, 211 and 216 or when the answer at the step 208 is negative, process goes to step 401 (FIG. 4). The process performed therein will be discussed later.

As set forth, when the weighted mean $S_{av}$ is a negative value as checked at the step 108 (FIG. 2), process directly jumps to a step 301. At the step 301, weighted mean $S_{av}$ is compared with a third wheel slippage criterion $S_3$ which is set at a greater value, e.g. 0.20, than the second wheel slippage criterion $S_2$ as seen from FIG. 9. If the weighted mean $S_{av}$ as checked at the step 301 is greater than or equal to the third wheel slippage criterion $S_3$, the wheel slippage area indicative data AREA is set at two (2) at a step 302. On the other hand, when the weighted mean $S_{av}$ is smaller than the third wheel slippage criterion $S_3$, the weighted mean $S_{av}$ is then compared with a fourth wheel slippage criterion $S_4$ which is set at a value, e.g. 0.12, greater than the first wheel slippage criterion $S_1$ but smaller than the second wheel slippage criterion $S_2$, at a step 303. When the weighted mean $S_{av}$ is greater than or equal to the fourth wheel slippage criterion $S_4$, the wheel slippage area indicative data AREA is set at a value one (1), at a step 305.

After one of the steps 302, 304, 305 and 212, 211', 216, step 401 is processed. At step 401, the wheel slippage area indicative data AREA is checked whether the data value is zero (0). As will be appreciated, the wheel slippage area indicative data AREA is set to zero when the weighted mean variation magnitude $S_{av}$ is greater than or equal to zero and the weighted mean $S_{av}$ is smaller than or equal to the first wheel slippage criterion $S_1$; or when the weighted mean variation magnitude $S_{av}$ is smaller than zero and the weighted mean $S_{av}$ is smaller than the fourth wheel slippage criterion $S_4$.

If the answer at step 401 is positive, then the throttle valve open angle characteristics indicative value MAPFLG is checked whether the value is zero which represents normal space throttle valve open angle variation characteristics, at step 402. When the throttle valve open angle characteristics indicative value MAPFLG is greater than zero (0) as checked at the step 402, a timer value UPTMR of a timer which is designed for measuring an interval of variation of the throttle valve open angle characteristics indicative value MAPFLG to reduce the value for rising the maximum step number STEP (%), and will be hereafter referred to as "MAP-UP timer", is compared with a predetermined set timer value $T_A$. In practice, the set timer value $T_A$ which corresponding to interval of updating the throttle value open angle characteristics indicative value MAPFLG, is set in a range of 100 msec to 200 msec. When the MAP-UP timer UPTMR is equal to or greater than the set timer value $T_A$, then the throttle valve open angle characteristics indicative value MAPFLG is decremented by one (1), at a step 404. Thereafter, the MAP-UP timer value IPTMR is cleared at a step 405. On the other hand, when the MAP-UP timer value UPTMR is smaller than the set timer value $T_A$ as checked at the step 403, the MAP-UP timer value UPTMR is incremented by one (1) at a step 406. When the steel slippage area indicative data AREA is not zero as checked at the step 401, the MAP-UP timer value UPTMR is cleared at a step 407.

After one of the step 405, 406 and 407 or when the throttle value open angle characteristics indicative value MAPFLG as checked at the step 402 is zero, process goes to a step 501. At the step 501, the wheel slippage area indicative data AREA is checked whether the data value is two (2). The wheel slippage area indicative data AREA is set at two (2) when the weighted mean variation magnitude $S_{av}$ is greater than or equal to zero and the weighted mean $S_{av}$ is greater than the second wheel slippage criterion $S_2$; or when the weighted mean variation magnitude $S_{av}$ is smaller than zero and the weighted mean $S_{av}$ is greater than the third wheel slippage threshold $S_3$, as shown in FIG. 9. It means that the wheel slippage occurring on the wheel is substantial level. Therefore, if the wheel slippage area indicative data AREA is two as checked at the step 501, the step number STEP is set at a predetermined traction control set value $TH_A$ which corresponds to a predetermined throttle open angle, e.g. 5%, irrespective of the throttle value open angle characteristics indicative value MAPFLG. On the other hand, if the wheel slippage area indicative area AREA is not two, it means that the magnitude of wheel slippage is not seriously great. Therefore, in such case, derivation of the step number STEP for driving the stepping motor 44 can be derived in relation to the accelerator position ACC in terms of the desired throttle value open angle characteristics defined by the throttle valve open angle characteristics indicative value MAPFLG. Therefore, when the answer at the step 501 is negative, the accelerator position data ACC which is derived through A/D conversion of the accelerator position indicative analog signal of the accelerator sensor 9 performed by the A/D converter 11, is read at a step 502. Based on the accelerator position data ACC read at the step 502, map look-up is performed for deriving a target step number STEP according to the throttle valve open angle characteristics indicative value MAPFLG at a step 503.

Based on the target step number STEP corresponding to the target throttle valve angular position, derived at the step 507 or 503, a difference Dif between the target step number STEP and the actual throttle valve angular position TH monitored by the throttle angle sensor 8, at a step 504. Based on the difference Dif derived at the step 504, the stepping motor driving speed and driving direction are determined at steps 505 and 506. At the steps 505 and 506, frequency of OCI (output compare interrupt) is set and motor driving direction indicative flag is set.

Figure 11:
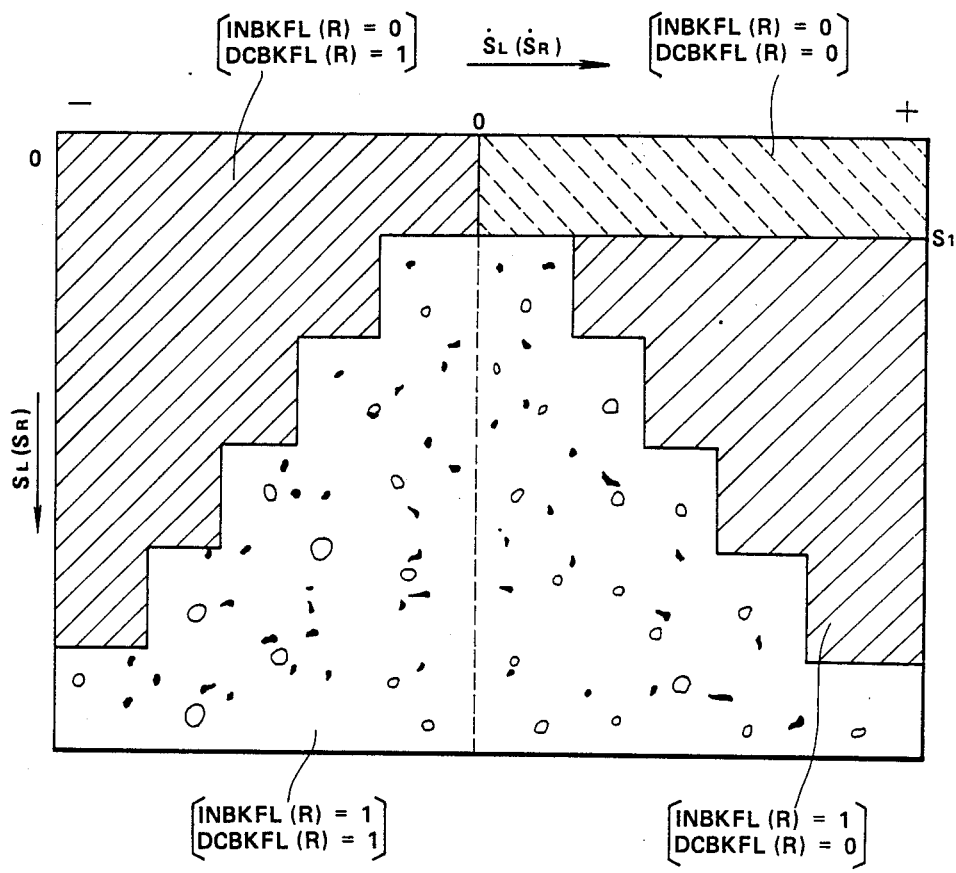
FIG. 11 is an illustration of a map for deriving braking force control valve on the basis of the weighted mean of the wheel slippage.
Figure 12:
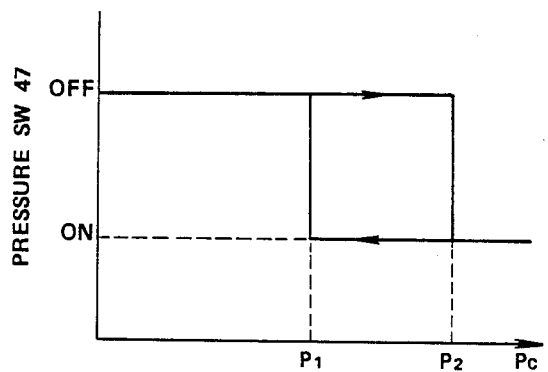
FIG. 12 is a chart showing ON and OFF operation of a fluid pump employed in the preferred embodiment of the traction control system of FIG. 1.

After completing step 506, steps 600a to 608a are performed, thus actuating brake control for the left driving wheel 2L. In the process of left brake control, a first check is performed to determine whether both the pressure increasing mode indicative flag INBKFL and the pressure decreasing mode indicative flag DCBKFL are reset, at a step 600a. These pressure increasing mode indicative flag INBKFL and the pressure decreasing mode indicative flag DCBKFL set and reset depending upon the wheel slippage $S_L$ at the left driving wheel 2L and variation magnitude $S_L$ according to the schedule as illustrated in FIG. 11. In the map shown in FIG. 11, when both of the pressure increasing mode indicative flag INBKFL and the pressure decreasing mode indicative flag DCBKFL are reset, braking pressure control by means of the traction control valve 24L is not active. Therefore, the vehicular brake circuit operates in normal mode to increase and decrease braking pressure depending upon the depression and release of the brake pedal. On the other hand, when the pressure increasing mode indicative flag INBKFL is set and the pressure decreasing mode indicative flag DCBKFL is reset, the traction control valve 24L becomes active to increase braking force in the wheel cylinder 23L for decelerating the left during wheel 2L. On the other hand, when both if the pressure increasing mode indicative flag INBKFL and the pressure decreasing mode indicative flag DCBKFL are set, the traction control valve 24L is active to maintain the braking force in the wheel cylinder 23L constant.

If both the pressure increasing mode indicative flag INBKFL and the pressure decreasing mode indicative flag DCBKFL are reset as checked at the step 600a, a brake control interval timer value BRKTML of the brake control interval timer is reset at a step 602a. Thereafter, at a step 603a, map look-up or table look-up steps are performed in terms of the left wheel slippage $S_L$ and the left wheel slippage variation magnitude $S_L$ for setting and resetting the aforementioned pressure increasing mode indicative flag INBKFL and the pressure decreasing mode indicative flag DCBKFL. Then, the pressure increasing mode indicative flag INBKFL and the pressure decreasing mode indicative flag DCBKFL are checked at a step 605a. When the pressure increasing mode indicative flag INBKFL is not set as checked at the step 605a, then, a pressure control signal ordering the normal valve position (A) of the electromagnetic valve 40L is output at a step 606a. On the other hand, when both the pressure increasing mode indicative flag INBKFL and the pressure decreasing mode indicative flag DCBKFL are set as checked at the step 605a, then the pressure control signal ordering the pressure holding valve position (B) is output at a step 607a. On the other hand, when the pressure increasing mode flat INBKFL is set and the pressure decreasing mode indicative flag DCBKFL is not set as checked at the step 605a, then the pressure control signal ordering the pressure increasing valve position (C) is output at a step 608a.

After completion of one of the steps 606a, 607a and 608a, process goes to steps 600b through 608b for controlling braking force for the first driving wheel 2R.

After process in the step 506, process enters into a steps 600b to 608b for performing brake control for the left driving wheel 2L. In the process of left brake control, at first check is performed whether both of pressure increasing mode indicative flag INBKFR and pressure decreasing mode indicative flag DCBKFR are reset, at a step 600b. These pressure increasing mode indicative flag INBKFR and the pressure decreasing mode indicative flag DCBKFR set and reset depending upon the wheel slippage $S_L$ at the left driving wheel 2L and variation magnitude $S_L$ according to the schedule as illustrated in FIG. 11.

If both of the pressure increasing mode indicative flag INBKFR and the pressure decreasing mode indicative flag DCBKFR are reset as checked at the step 600b, a brake control interval timer value BRKTMR of the brake control interval timer is reset at a step 602b. Thereafter, at a step 603b, map look-up or table look-up in terms of the left wheel slippage $S_R$ and the left wheel slippage variation magnitude $S_R$ for setting and resetting the aforementioned pressure increasing mode indicative flag INBKFR and the pressure decreasing mode indicative flag DCBKFR. Then, the pressure increasing mode indicative flag INBKFR and the pressure decreasing mode indicative flag DCBKFR are checked at a step 605b. When the pressure increasing mode indicative flag IMBKFR is not set as checked at the step 605b, then, a pressure control signal ordering the normal valve position (A) of the electromagnetic valve 40L is output at a step 606b. On the other hand, when both of the pressure increasing mode indicative flag INBKFR and the pressure decreasing mode indicative flag DCBKFR are set as checked at the step 605b, then the pressure control signal ordering the pressure holding valve position (B) is output at a step 607b. On the other hand, when the pressure increasing mode flag INBKFR is set and the pressure decreasing mode indicative flag DCBKFR is not set as checked at the step 605b, then the pressure control signal ordering the pressure increasing valve position (C) is output at a step 608b.

After completing one of the steps 606a, 607a and 608a, the process goes to a step 701, in which the input level from the pressure switch 47 is checked. Namely, when the pressure Pc accumulated in the pressure accumulator 43 is higher than or equal to the predetermined pressure, the pressure switch 47 is maintained OFF to input LOW level signal. In response to this, the LOW level motor control signal is output to maintain the electric motor inoperative, at a step 703. On the other hand, when the pressure Pc drops below the predetermined pressure, the HIGH level motor control signal is output to drive the electric motor 44 at a step 702. After one of the steps 702 and 703, process goes END.

Figure 8:
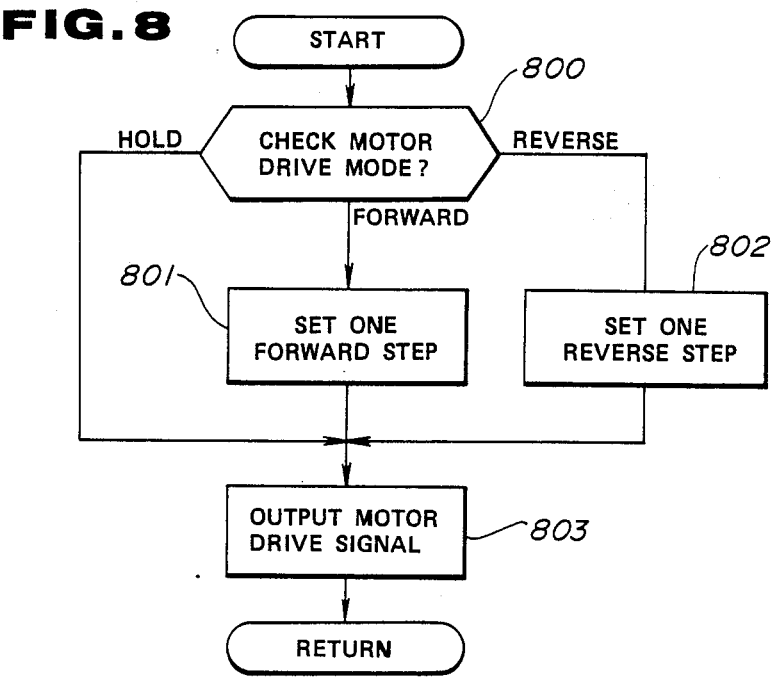
FIG. 8 is a flowchart of an interrupt routine for outputting a motor drive signal.

FIG. 8 shows OCI routine for controlling throttle valve angular position. The shown routine is designed to be executed at a frequency for achieving the motor speed derived at the step 505. In other words, the frequency of OCI routine is variable depending upon the desired motor speed derived at the step 505. Immediately after starting execution, the motor driving mode is checked at a step 800. Namely, the stepping motor 5 is driven in three different modes, i.e. FORWARD mode in which the stepping motor is incrementally driven in forward direction, REVERSE mode, in which the stepping motor is decrementally driven in reverse direction and HOLD mode, in which the stepping motor is held at the present position.

The motor driving mode can be discriminated from the result of the step 506. Therefore, in the step 800, motor driving direction indicative flag set in the step 506 is checked. When the driving mode in FORWARD mode, the motor drive control signal is set for driving the stepping motor 4 for one step, at a step 801. Similarly, when the driving mode is REVERSE mode, the motor drive control signal is set for drive the stepping motor in reverse direction for one step, at a step 802. After one of the step 801 and 802 or when the motor driving mode is the HOLD mode, process goes to a step 803, in which the motor drive control signal is fed to the motor drive circuit 13 for driving the motor for controlling motor operation according to the set motor drive control signal. Namely, when the one step of forward driving is set at the step 801, the motor drive circuit 13 output electric power for driving the stepping motor for one step in forward direction causes increasing of the throttle valve open angle at the corresponding magnitude. On the other hand, when the one step of reverse driving is set at the step 802, the motor drive circuit outputs electric power for driving the stepping motor and one step in reverse direction for causes decreasing of the throttle valve open angle in the corresponding magnitude. Furthermore, when the motor drive mode is HOLD mode, then no electric power is supplied and thus the throttle valve is maintained at the present angular position.

Traction control operation performed by the preferred embodiment of the traction control system as set forth above will be discussed hereinbelow with reference to the timing chart of FIG. 13. In the example of operation illustrated in FIG. 13, the left and right driving wheels 2L and 2R are on the road surface having the same road friction level $\mu$ until a time $t_5$; and after $t_5$, the left and right driving wheels are one the road surfaces of different road friction level $\mu$. Therefore, until the time $t_5$, wheel slippage occurs at both of the left and right wheels 2L and 2R substantially in synchronism with each other, as seen from the wheel speeds $V_{RL}$ and $V_{RR}$. In the shown example, it is assumed that the left wheel 2L is on the relatively high friction road surface and the right wheel 2R is on the relatively low friction road surface, after the time $t_5$. Therefore, as will be clear from the wheel speeds $V_{RL}$ and $V_{RR}$ after the time $t_5$, the wheel slippage at the right driving wheel 2R becomes greater than that of the left driving wheel 2L. Furthermore, in the chart of FIG. 11, the weighted mean $V_{av}$ of the left and right wheel speeds $V_{RL}$ and $V_{RR}$ is illustrated by the broken line. The wheel speed weighted mean $V_{av}$ corresponds to the weighted mean $S_{av}$ of the wheel slippages $S_L$ and $S_R$.

As will be clear from the discussion of the traction control routine given above, control for the throttle valve open angle is performed on the basis of the weighted mean $S_{av}$ of the left and right wheel slippages $S_L$ and $S_R$. On the other hand, control for the brake system is performed on the basis of the wheel slippages $S_L$ and $S_R$ of respectively associated left and right wheels 2L and 2R.

In the shown example, the wheel slippage weighted mean $S_{av}$ is maintained to be smaller than the first wheel slippage criterion $S_1$ until a time $t_1$. Therefore, through the period before the time $t_1$, the throttle valve open angle characteristics indicative value MAPFLG is set zero and throttle valve angular position is controlled according to the accelerator position data ACC and the throttle valve angle position data TH, in normal state through the steps 502 and 506.

During this period, the brake control is held inactive. Namely, as seen from the chart of FIG. 13, since the wheel slippage $S_L$ at the left driving wheel 2L and the variation magnitude $S_L$ maintains the condition for resetting both of the pressure increasing mode indicative flag INBKFL and the pressure decreasing mode indicative flag DCBKFL, the electromagnetic valve 40L is set at the normal valve position (A) through the process of the steps of 600a through 608a as set forth. Similarly, since the wheel slippage $S_R$ at the right driving wheel 2R and the variation magnitude $S_R$ maintains the condition for resetting both of the pressure increasing mode indicative flag INBKFR and the pressure decreasing mode indicative flag DCBKFR, the electromagnetic valve 40R is set at the normal valve position (A) through the process of the steps of 600b through 608b as set forth. Therefore, during the period before the time $t_1$, the braking force to be generated in the wheel cylinder 23L and 23R is determined simply depending upon the magnitude of depression of the brake pedal. At the time $t_1$, the weighted mean $V_{av}$ of the left and right wheel speed $V_{RL}$ and $V_{RR}$ reaches the first wheel slippage criterion $S_1$ as seen from FIG. 13. This causes the answer at the step 151 to switch from negative to positive. Therefore, at the first execution cycle of the routine of FIGS. 2 through 7 after the time $t_1$, the process of the steps 202 through 205 is performed. As seen, since the throttle valve open angle characteristics indicative value MAPFLG is maintained zero before the time $t_1$, the answer at the step 218 is positive. Therefore, at the step 217, the throttle valve open angle characteristics indicative value MAPFLG is set to 13. Therefore, after the time $t_1$, the throttle valve open angle is controlled according to the characteristics as defined by the throttle valve open angle characteristics indicative value MAPFLG (=13) in relation to the accelerator position ACC. Therefore, the engine output variation characteristics relative to the depression magnitude of the accelerator pedal can be lowered for distributing limited driving torque for the left and right driving wheels 2L and 2R.

At the same time, since the weighted mean $S_{av}$ is greater than or equal to the first wheel slippage criterion $S_1$ and weighted mean variation magnitude indicative value $S_{av}$ is maintained positive, the wheel slippage area indicative data AREA is set at one (1) through the process of the steps 206 and 213.

Figure 13:
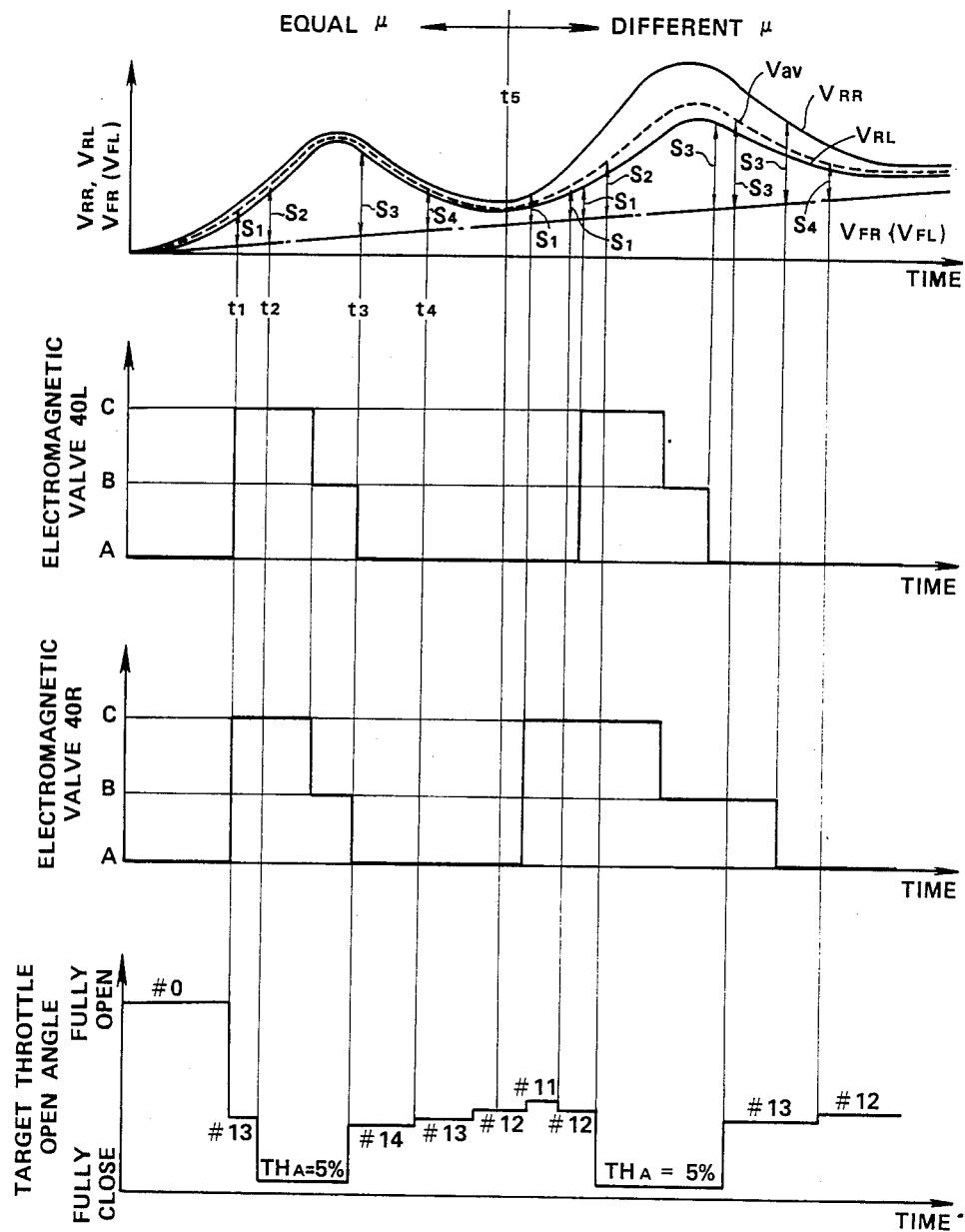
FIG. 13 is a timing chart showing example of practical operation of the preferred embodiment of the traction control system according to the present invention.

In the shown example, the wheel slippages $S_L$ and $S_R$ increases across a given pressure increasing criterion as shown in FIG. 13 and FIG. 11. In response to this, the pressure increasing mode indicative flags INBKFL and INBKFR are set through the steps 600a and 608b. However, at this time, since the setting condition of the pressure decreasing mode indicative flags DCBKFL and DCBKFR are not established, these pressure decreasing mode indicative flags are maintained in the reset state. Therefore, through the steps 608a and 608b, both of the electromagnetic valves 40L and 40R are shifted to the pressure increasing valve position (C). Therefore, the traction control valves 24L and 24R becomes active to increase the braking force in the wheel cylinders 23L and 23R. As a result, the left and right wheels 2L and 2R are decelerated for recovery of road traction.

As seen from FIG. 13, at the time $t_1$, since the left and right driving wheels 2L and 2R are subject substantially the road friction to vary the wheel speeds $V_{RL}$ and $V_{RR}$ synchronously to each other. Therefore, the valve timing for of the traction control valves 24L and 24R are substantially the same to each other. Therefore, at this time, the left and right driving wheels 2L and 2R are decelerated synchronously to each other.

At a time $t_2$, the weighted means $V_{av}$ corresponding to the weighted mean $S_{av}$ of the left and right wheel slippages $S_L$ and $S_R$ reaches the second wheel slippage criterion $S_2$. In response to this, the wheel slippage area indicative data AREA is set to two (2) through the process of the steps 206 and 207. As a result, the answer at the step 501 becomes positive. Therefore, the throttle valve open angle is set at the predetermined throttle angle limit value $TH_4$, e.g. 5% of the fully opened condition, irrespective of the throttle valve open angle characteristics indicative value MAPFLG, at the step 507. During this process, the throttle valve open angle characteristics indicative value MAPFLG is incremented by one (1) through the process of the steps 210 and 211 by the execution cycle of the routine executed immediately after the time $t_2$. Therefore, though the throttle valve open angle is set at the throttle angle limit value $TH_4$ as set forth, the throttle valve open angle characteristics indicative value MAPFLG is maintained at a value 14. The throttle valve open angle is maintained at the value $TH_4$ until the weighted mean $S_{av}$ is decreased across the third wheel slippage criterion $S_3$ at a time $t_3$.

During the period between the time $t_2$ and the time $t_3$, the pressure decreasing condition is satisfied at certain timing. This causes setting of the pressure decreasing mode indicative flags DCBKFL and DCBKFR through the steps 603a and 603b. Therefore, the electromagnetic valves 40L and 40R are shifted to the pressure holding valve position (B) through the step 607a and 607b. Therefore, the pressure in the wheel cylinders 23L and 23R is maintained constant to apply a constant braking force at the increased braking force level.

At the time $t_3$, the weighted mean $S_{av}$ decreases across the third wheel slippage criterion $S_3$. As a result, the wheel slippage area indicative data AREA is set to one (1) through the process of the steps 301, 303 and 304. Therefore, the answer at the step 501 becomes negative. Therefore, the throttle valve angular position is determined in relation to the accelerator pedal position ACC according to the throttle valve angular position variation characteristics as defined by the throttle valve open angle characteristics indicative value MAPFLG, i.e. 14, through the steps 502 and 503.

In the shown embodiment, at the time $t_3$, the wheel slippages $S_L$ and $S_R$ and the wheel slippage variation magnitudes $S_L$ and $S_R$ satisfies resetting condition of the pressure increasing mode indicative flags INBKFL and INBKFR. Resetting of the pressure increasing mode indicative flags INBKFL and INBKFR cause the electromagnetic valves 40L and 40R to be set at the normal valve position (A) through the step 606a and 606b.

At a time $t_4$, the weighted mean $S_{av}$ further decreases across the fourth wheel slippage criterion $S_4$. In response to this, the wheel slippage area indicative data AREA is set to zero (0) through the process of the steps 303 and 305. This indicates that the wheel slippage is maintained at a small magnitude. Therefore, the throttle valve open angle characteristic indicative value, MAPFLG, is periodically incremented through the process of the steps 401 through 406 with an interval defined by the MAP-UP timer value UPTMR.

After the time $t_5$, the vehicle travels on a road in which the rod frictions $\mu$ at respective left and right driving wheels 2L and 2R. In the traction control in such driving condition, the engine output control is performed substantially the same manner as discussed with respect to the period between the time $t_1$ through time $t_5$. The weighted mean $S_{av}$ is derived through arithmetic operation giving greater weight for the wheel slippage data representing smaller wheel slippage than the other, but, with taking the wheel speed data representing the greater wheel slippage, the engine torque reduction may not be significantly small for the wheel causing greater wheel slippage withholding reasonable engine acceleration characteristics.

On the other hand, since the braking force to be generated with respect to the wheel cylinders 23L and 23R, which are controlled independently to each other as shown in the chart after the time $t_5$ of FIG. 13, optimum wheel deceleration for respective driving wheel can be obtained.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without department from the principle of the invention set out in the appended claims.

Figure 14:
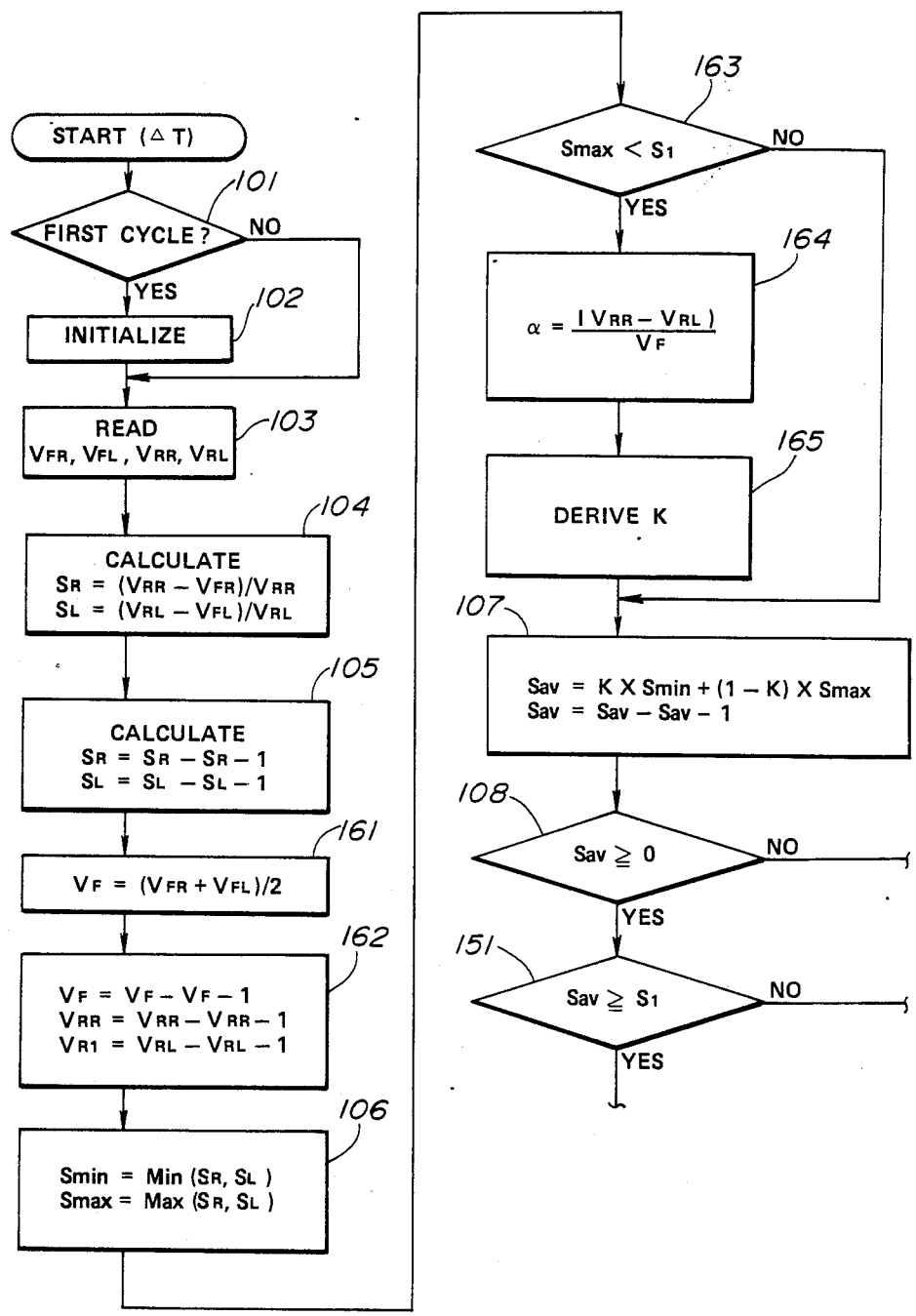
FIG. 14 is a flowchart showing part of modification for the traction control program of FIGS. 2 through 7.

For example, as shown in FIG. 14, it is possible to vary the weighting coefficient K. The routine shown in FIG. 14 is part of the traction control routine, which part is modified from the routine of FIGS. 2 to 7. As will be appreciated, the shown routine is different from the former routine of FIGS. 2 to 7 in terms of the process of steps 161 to 165, in which the steps 161 and 162 are inserted between the steps 105 and 106, and the steps 163 to 165 are inserted between the steps 106 to 107.

At a step 161, an average speed $V_F$ of the left and right driven wheels 1L and 1R is derived of the basis of the wheel speed $V_{FL}$ and $V_{FR}$ by:

$$V_F = (V_{FL} + V_{FR})/2$$

At a step 162, a variation $V_F (= V_F - V_{F-1}: V_{F-1}$ is the average driven wheel spaced derived in the immediately preceding execution cycle) of the average driven wheel speed, a variation $V_{RL} (= V_{RL} - V_{RL-1}: V_{RL-1}$ is the left driving wheel speed read in the immediately preceding cycle) of the left driving wheel speed $V_{RL}$ and a variation $V_{RR} (= V_{RR} - V_{RR-1}: V_{RR-1}$ is the left driving wheel speed read in the immediately preceding cycle) of the left driving wheel speed $V_{RR}$ are derived.

Figure 15:
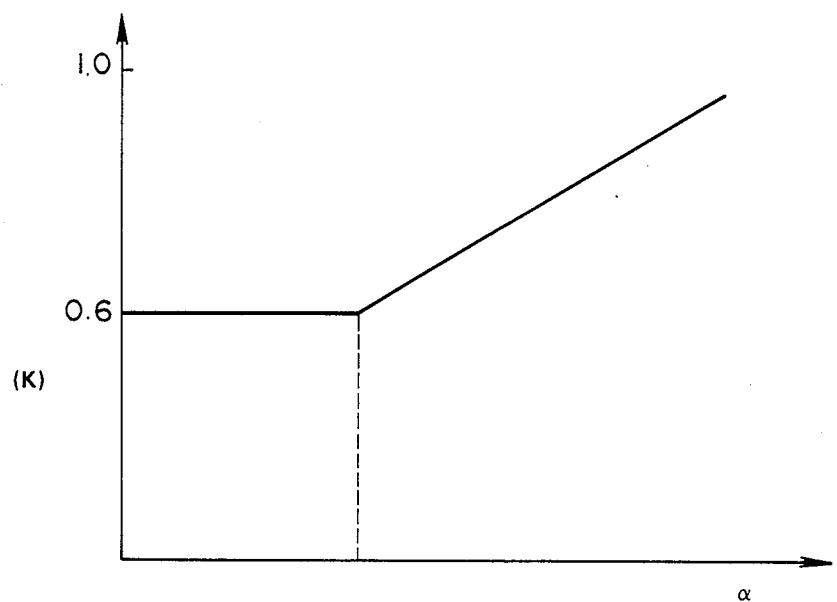
FIG. 15 is a chart showing variation of weighing coefficient K in relation to magnitude $\alpha$ of unbalance of road frictions $\mu$ at left and right wheels.

At a step 163, the greater wheel slippage $S_{max}$ is compared with the first wheel slippage criterion $S_1$ to check whether the greater wheel slippage $S_{max}$ is smaller than the first wheel slippage criterion $S_1$. If the wheel slippage $S_{max}$ is greater than or equal to the first wheel slippage criterion $S_1$, process immediately goes to the step 107. On the other hand, if the wheel slippage $S_{max}$ is smaller than the first wheel slippage criterion $S_1$, a road frictions difference indicative data $\alpha$ is derived by:

$$\alpha = (|V_{RR} - V_{RL}|)/V_F$$

at a step 164. Then, at a step 165, the weighing coefficient K is derived in terms of the road friction difference indicative data $\alpha$ according to the characteristics shown in FIG. 15. As will be seen from FIG. 15, the weighing coefficient K increases according to increasing of the road friction difference indicative data $\alpha$. Therefore, weight for the smaller wheel slippage data is increased according to the increasing of the road friction difference.

As will be appreciated herefrom, the present invention can provide better traction control performance with avoiding excessive reduction of the engine output and with suppressing excessive braking. Therefore, the present invention fulfills all of the objects and advantages sought therefor.

What is claimed is:

1. A traction control system for an automotive vehicle, comprising:
- first engine controlling means associated with an automotive internal combustion engine, for adjusting an engine output;
- second brake controlling means associated with a first driving wheel which is connected to said automotive internal combustion engine to be driven by said engine output and associated with a first brake circuit connected to a first wheel cylinder of said first driving wheel, for controlling braking force to be generated in said first wheel cylinder;
- third brake controlling means associated with a second driving wheel which is connected to said automotive internal combustion engine to be driven by said engine output and associated with a second brake circuit connected to a second wheel cylinder of said second driving wheel, for controlling braking force to be generated in said second wheel cylinder;
- first sensor means for monitoring wheel speed of said first driving wheel to produce a first driving wheel speed indicative signal;
- second sensor means for monitoring wheel speed of said second driving wheel to produce a second driving wheel speed indicative signal;
- third sensor means for monitoring vehicular body speed representative parameter for producing a vehicular body speed representative data;
- first arithmetic means for deriving a wheel slippage at said first driving wheel on the basis of said first driving wheel spaced indicative signal and said vehicular body speed representative data for generating a first wheel slippage data;
- second arithmetic means for deriving a wheel slippage at said second driving wheel on the basis of said second driving wheel speed indicative signal and said vehicular body speed representative data for generating a second wheel slippage data;
- third arithmetic means for deriving a weighted mean of said first and second wheel slippage data with a weighing coefficient which provides greater weight for one of said first and second wheel slippage data representing smaller wheel slippage than the other;
- first control means, associated with said first engine controlling means, for controlling said engine output on the basis of said weighted mean; and
- second control means, associated with said second brake controlling means, for controlling operation of said second brake control means for adjusting braking force to be generated in said first wheel cylinder on the basis of said first wheel slippage data; and
- third control means, associated with said third brake controlling means and operative independently of said second control means, for controlling operation of said third brake controlling means, for adjusting braking force to be generated in said second wheel cylinder on the basis of said second wheel slippage data.

2. A traction control system as set forth in claim 1, wherein said first control means is associated with a fourth sensor monitoring position of an accelerator for adjusting the engine output according to an engine output variation characteristic variable between a predetermined initial minimum output and a predetermined initial maximum output linearly corresponding to position of said accelerator which is variable between a predetermined minimum operational position and a predetermined maximum operational position, and said first control means is responsive to said weighted mean greater than a predetermined first threshold for modifying said engine output variation characteristic by setting the maximum output at a predetermined first value smaller than said predetermined initial maximum output.

3. A traction control system as set forth in claim 2, wherein said first control means is further responsive to said weighted mean greater than a predetermined second threshold for setting said engine output at a predetermined second value which is smaller than said predetermined first value.

4. A traction control system as set forth in claim 1, which further comprises a fourth arithmetic means for deriving variation of said weighted mean for discriminating increasing and decreasing of said wheel slippage of said first and second driving wheels, and said first control means is associated with a fourth sensor monitoring position of an accelerator for adjusting the engine output according to an engine output variation characteristic variable between a predetermined initial minimum output and a predetermined initial maximum output linearly corresponding to position of said accelerator which is variable between a predetermined minimum operational position and a predetermined maximum operational position, and said first control means is active while said weighted mean is greater than a predetermined first threshold and performs traction control operation for modifying said engine output variation characteristic by setting the maximum output at a predetermined first value smaller than said predetermined initial maximum output when said weighted mean is increasing.

5. A traction control system as set forth in claim 4, wherein said first control means is further responsive to said weighted mean greater than a predetermined second threshold for setting said engine output at a predetermined second value which is smaller than said predetermined first value.

6. A traction control system as set forth in claim 5, wherein said first control means is responsive to said weighted mean decreasing across a third threshold for gradually returning said engine output variation characteristics toward an initial characteristic in which the engine output varies between said predetermined initial minimum output and said predetermined initial maximum output linearly corresponding to position of said accelerator which is variable between said predetermined minimum operational position and said predetermined maximum operational position.

7. A traction control system as set forth in claim 6, wherein said first control means varies said engine output characteristic in stepwise fashion with a predetermined interval.

8. A traction control system as set forth in claim 7, wherein said predetermined third threshold is set at a value greater than said predetermined first threshold and smaller than said predetermined second threshold.

9. A traction control system as set forth in claim 1, wherein each of said second and third brake controlling means comprises:
- a first valve means disposed within the associated one of said first and second brake circuit for operation in a normal mode, to establish communication with said wheel cylinder to a master cylinder for controlling braking force depending upon magnitude of depression of a brake pedal, and operable in a traction control mode, for disconnecting said wheel cylinder from said master cylinder and forming a closed circuit including said wheel cylinder to compress the working fluid therein for increasing braking force in said wheel cylinder; and a second valve means associated with said first valve and controlled by associated one of said second and third control means, for switching between said normal mode and said traction control mode.

10. A traction control system as set forth in claim 9, wherein said first valve means operates to increase said braking pressure in said wheel cylinder and to hold said braking force constant, in said traction control mode.

11. A traction control system for an automotive vehicle, comprising:

first engine controlling means associated with an automotive internal combustion engine, for adjusting an engine output;

second brake controlling means associated with a first driving wheel which is connected to said automotive internal combustion engine to be driven by said engine output and associated with a first brake circuit connected to a first wheel cylinder of said first driving wheel, for controlling braking force to be generated in said first wheel cylinder;

third brake controlling means associated with a second driving wheel which is connected to said automotive internal combustion engine to be driven by said engine output and associated with a second brake circuit connected to a second wheel cylinder of said second driving wheel, for controlling braking force to be generated in said second wheel cylinder;

first sensor means for monitoring wheel speed of said first driving wheel to produce a first driving wheel speed indicative signal;

second sensor means for monitoring wheel speed of said second driving wheel to produce a second driving wheel speed indicative signal;

third sensor means for monitoring vehicular body speed representative parameter for producing a vehicular body speed representative data;

first arithmetic means for deriving a wheel slippage at said first driving wheel on the basis of said first driving wheel speed indicative signal and said vehicular body speed representative data for generating a first wheel slippage data;

second arithmetic means for deriving a wheel slippage at said second driving wheel on the basis of said second driving wheel speed indicative signal and said vehicular body speed representative data for generating a second wheel slippage data;

third arithmetic means for deriving a weighted mean of said first and second wheel slippage data with a weighing coefficient which provides greater weight for one of said first and second wheel slippage data representing smaller wheel slippage than the other;

first control means, associated with said first engine controlling means, for controlling said engine output on the basis of said weighted mean and variation of said weighted mean; and second control means, associated with said second brake controlling means, for controlling operation of said second brake control means for adjusting braking force to be generated in said first wheel cylinder on the basis of said first wheel slippage data and variation of said first wheel slippage; and third control means, associated with said third brake controlling means and operative independently of said second control means, for controlling operation of said third brake controlling means, for adjusting braking force to be generated in said second wheel cylinder on the basis of said second wheel slippage data and variation of said second wheel slippage data.

12. A traction control system as set forth in claim 11, wherein said first control means is associated with a fourth sensor monitoring position of an accelerator for adjusting the engine output according to an engine output variation characteristic variable between a predetermined initial minimum output and a predetermined initial maximum output linearly corresponding to position of said accelerator which is variable between a predetermined minimum operational position and a predetermined maximum operational position, and said first control means is responsive to said weighted mean greater than a predetermined first threshold for modifying said engine output variation characteristic by setting the maximum output at a predetermined first value smaller than said predetermined initial maximum output.

13. A traction control system as set forth in claim 12, wherein said first control means is further responsive to said weighted mean greater than a predetermined second threshold for setting said engine output at a predetermined second value which is smaller than said predetermined first value.

14. A traction control system as set forth in claim 11, which further comprises a fourth arithmetic means for deriving variation of said weighted mean for discriminating increasing and decreasing of said wheel slippage of said first and second driving wheels, and said first control means is associated with a fourth sensor monitoring position of an accelerator for adjusting the engine output according to an engine output variation characteristic variable between a predetermined initial minimum output and a predetermined initial maximum output linearly corresponding to position of said accelerator which is variable between a predetermined minimum operational position and a predetermined maximum operational position, and said first control means is active while said weighted mean is greater than a predetermined first threshold and performs traction control operation for modifying said engine output variation characteristic by setting the maximum output at a predetermined first value smaller than said predetermined initial maximum output when said weighted mean is increasing.

15. A traction control system as set forth in claim 14, wherein said first control means is further responsive to said weighted mean greater than a predetermined second threshold for setting said engine output at a predetermined second value which is smaller than said predetermined first value.

16. A traction control system as set forth in claim 15, wherein said first control means is responsive to weighted mean decreasing across a third threshold for gradually returning said engine output variation characteristic toward an initial characteristic in which the engine output varies between said predetermined initial minimum output and said predetermined initial maximum output linearly corresponding to position of said accelerator which is variable between said predetermined minimum operational position and said predetermined maximum operational position.

17. A traction control system as set forth in claim 16, wherein said first control means varies said engine output characteristic in stepwise fashion with a predetermined interval.

18. A traction control system as set forth in claim 17, wherein said predetermined third threshold is set at a value greater than said predetermined first threshold and smaller than said predetermined second threshold.

19. A traction control system as set forth in claim 18 wherein each of said second and third brake controlling means comprises:

a first valve means disposed within the associated one of said first and second brake circuit for operation in a normal mode, to establish communication with said wheel cylinder to a master cylinder for controlling braking force depending upon magnitude of depression of a brake pedal, and operable in a traction control mode, for disconnecting said wheel cylinder from said master cylinder and forming a closed circuit including said wheel cylinder to compress the working fluid therein for increasing braking force in said wheel cylinder; and a second valve means associated with said first valve and controlled by associated one of said second and third control means, for switching between of said normal mode and said traction control mode.

20. A traction control system as set forth in claim 19, wherein said first valve means operates to increase said braking pressure in said wheel cylinder and to hold said braking force constant, in said traction control mode.

* * * * *

UNITED STATES PATENT AND TRADEMARK OFFICE
CERTIFICATE OF CORRECTION

PATENT NO. : 4,964,045

DATED : October 16, 1990

INVENTOR(S) : Iwata et al.

It is certified that error appears in the above-identified patent and that said Letters Patent is hereby corrected as shown below:

```
Column 19, line 32, change "spaced" to --speed--.
Column 22, line 61, after "to" insert --said--.
Column 24, line 10, delete "of".
```

Signed and Sealed this

Seventh Day of April, 1992

Attest:

HARRY F. MANBECK, JR.

Attesting Officer

Commissioner of Patents and Trademarks